July 23, 1940.　　　　C. A. CAMPBELL　　　　2,209,258
AIR BRAKE
Filed Oct. 23, 1939　　　　4 Sheets-Sheet 1
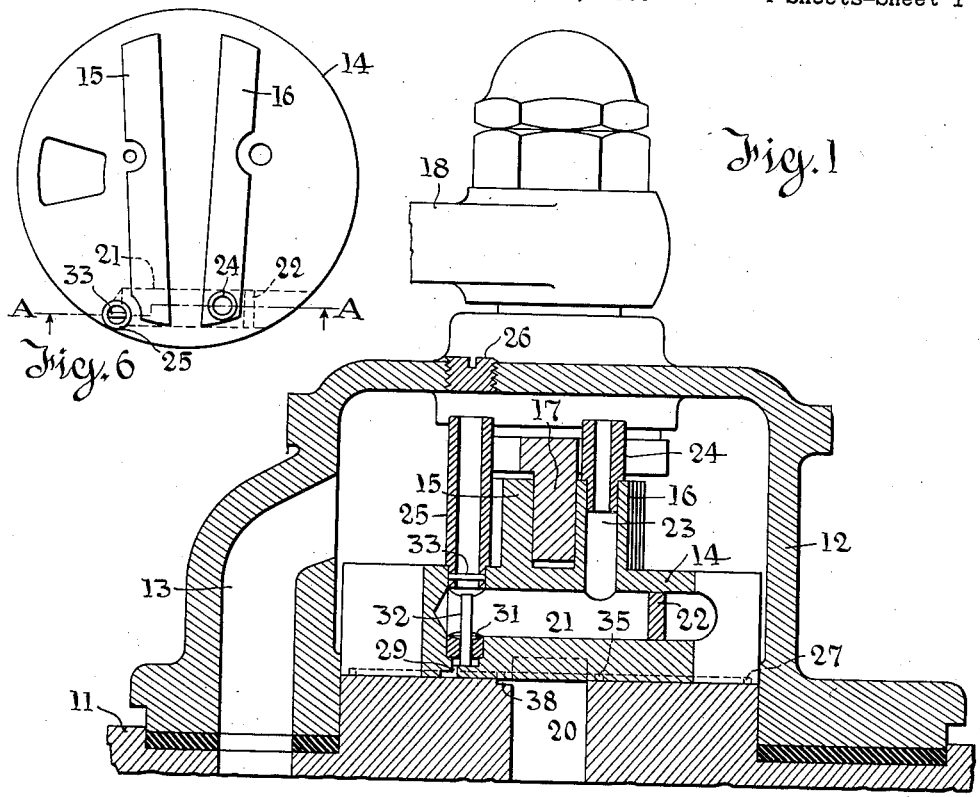
Fig. 1
Fig. 6
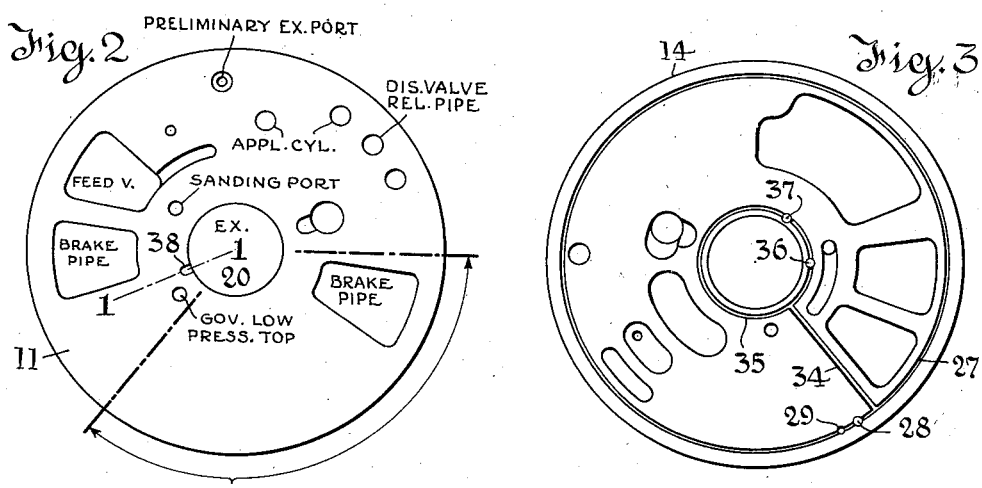
Fig. 2
PRELIMINARY EX. PORT
DIS. VALVE REL. PIPE
APPL. CYL.
FEED V.
SANDING PORT
BRAKE PIPE
EX.
BRAKE PIPE
GOV. LOW PRESS. TOP
LIMITS OF TRAVEL OF RADIAL OIL GROOVE OF ROTARY VALVE
Fig. 3
Inventor
Charles A. Campbell
By Dodge and Sons
Attorneys July 23, 1940.  C. A. CAMPBELL  2,209,258
AIR BRAKE
Filed Oct. 23, 1939  4 Sheets-Sheet 2
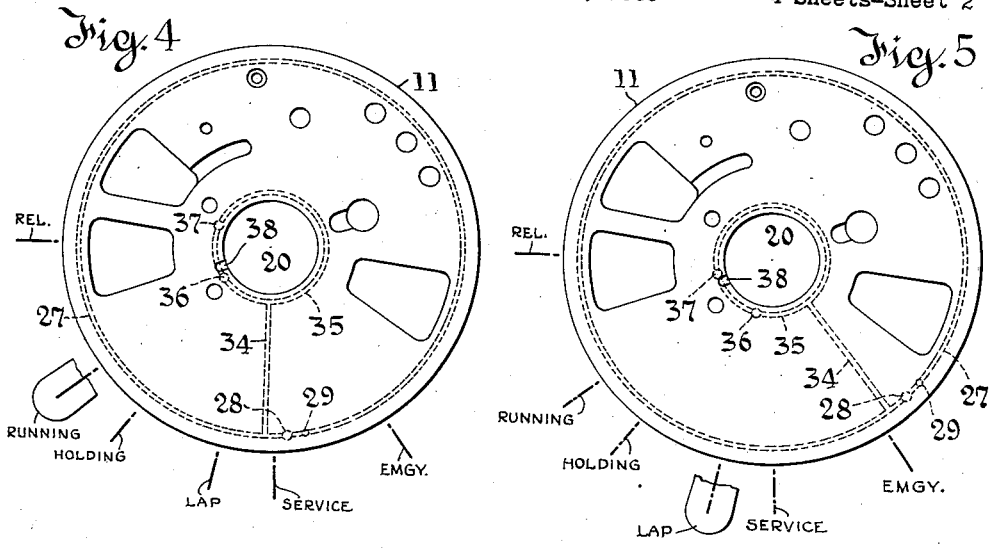
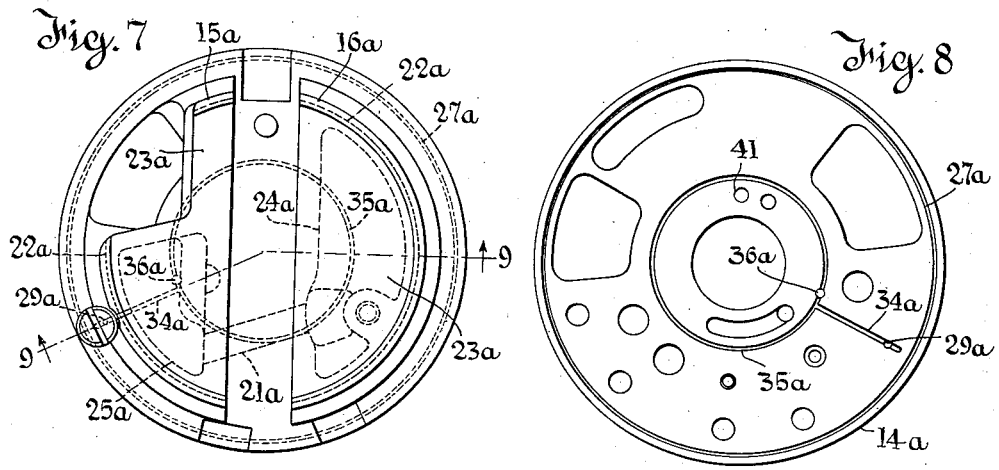
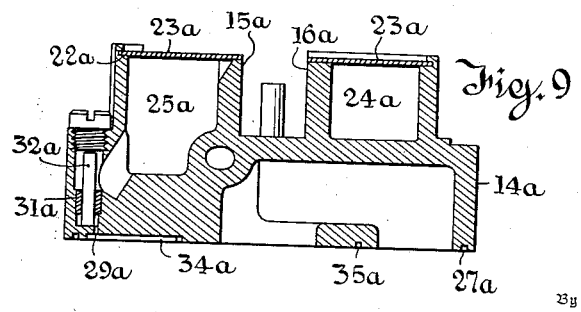
Inventor
Charles A. Campbell
By
Dodge and Sons
Attorneys July 23, 1940.  C. A. CAMPBELL  2,209,258
AIR BRAKE
Filed Oct. 23, 1939  4 Sheets-Sheet 3
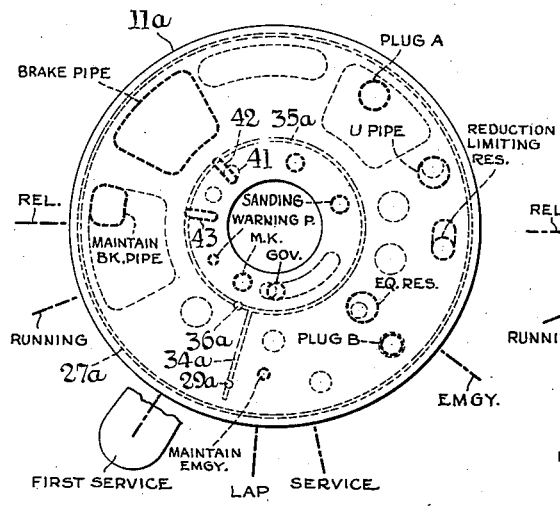
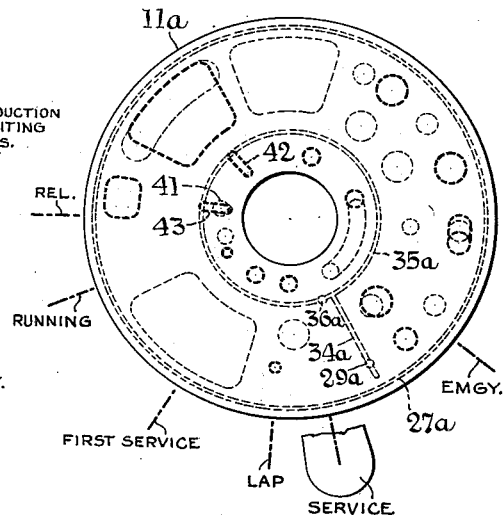
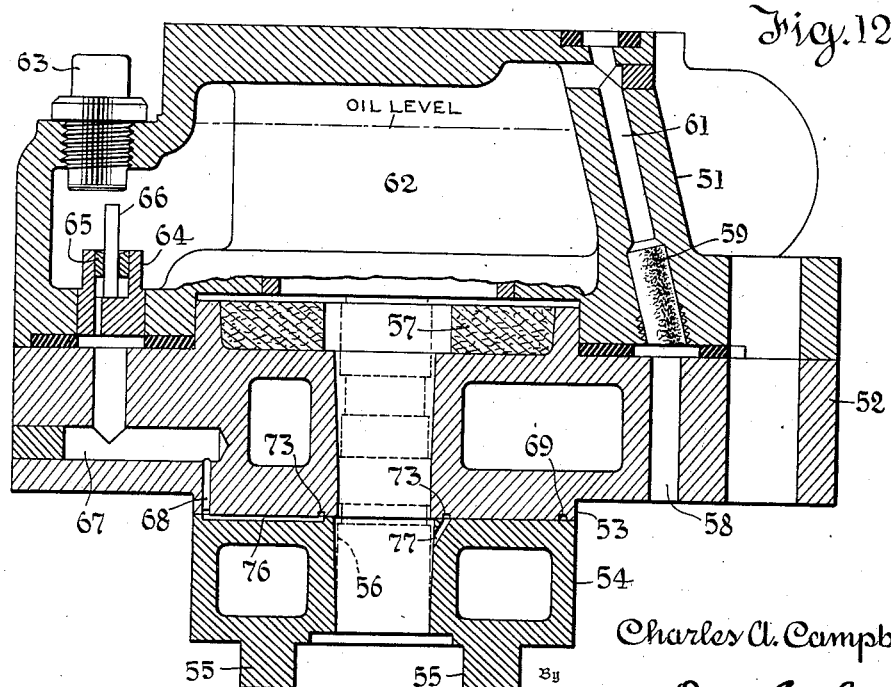
Inventor
Charles A. Campbell
By
Attorneys July 23, 1940.　　　　C. A. CAMPBELL　　　　2,209,258
AIR BRAKE
Filed Oct. 23, 1939　　　　4 Sheets-Sheet 4
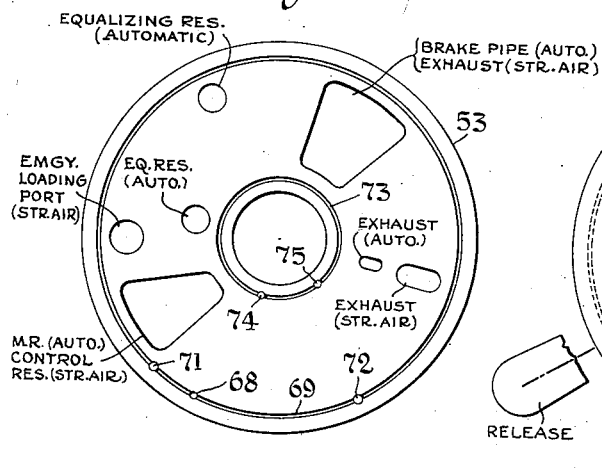
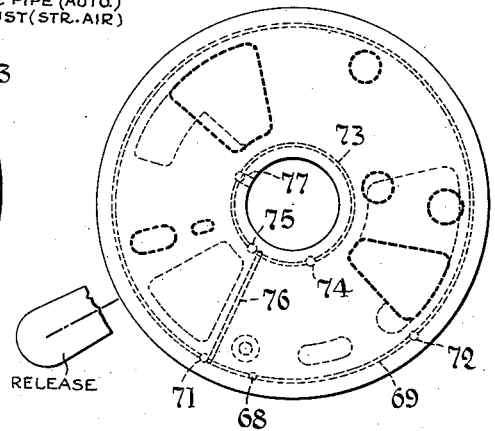
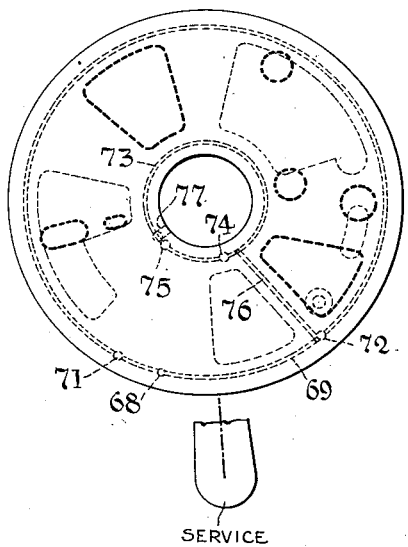
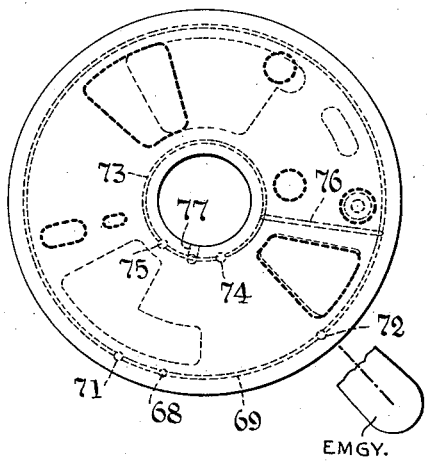
Inventor
Charles A. Campbell
By
Dodge and Sons
Attorneys Patented July 23, 1940

2,209,258

UNITED STATES PATENT OFFICE 2,209,258

AIR BRAKE

Charles A. Campbell, Watertown, N. Y., assignor to The New York Air Brake Company, a corporation of New Jersey Application October 23, 1939, Serial No. 300,823

9 Claims. (Cl. 303—56)

This invention relates to air brakes, and particularly to the rotary valve of an engineer's brake valve.

The application is filed as a continuation in part of my pending application Serial No. 250,663 filed January 12, 1939. The device illustrated in Figures 1 to 5 of the drawings and the descriptive matter relating thereto are taken bodily from the prior application, above-identified.

While the principles described with reference to Figures 1 to 6 can be applied satisfactorily to practically any type of rotary engineer's brake valve, it has been found expedient in applying the invention to certain types of rotary brake valves to depart in certain minor respects from the exact arrangement of oil passages set up in the prior application. It seems expedient, therefore, to illustrate certain of these special applications of the invention to the end that various specifically different embodiments of the invention may be shown and their general equivalence made plain.

Generally, it may be said that Figures 1 to 6 of the parent application show how the invention may be applied to the well-known H-6 brake valve.

Figures 7 to 11, inclusive, show how it may be applied to the H-8 brake valve which involves an additional position known as First service, between Running and Lap positions. In addition, there are slight differences as between the two embodiments because in the second embodiment the outer groove is merely an oil retaining groove and is disconnected from the oil feed path proper.

The arrangement shown for the H-6 valve may be used for the H-8 valve, and the arrangement shown for the H-8 valve may be used for the H-6 valve, but where high pressures are encountered the arrangement shown for the H-8 valve is considered to be better.

Figures 12 to 16, inclusive, show the manner in which the invention is applied to the HS-4 brake valve, the arrangement used being something of a compromise between that shown in Figures 1 to 6 and that shown in Figures 7 to 11, respectively. This last embodiment shows means for lubricating the key or stem by which the rotary valve is turned. It may be remarked that the HS-4 valve is a convertible valve which at times operates on the straight-air principle, and at other times on the automatic principle. Interchange of functions of certain of the ports presents a particularly difficult problem because the oil grooves must not connect ports which are at different pressures.

Lubrication of engineer's brake valves and particularly engineer's brake valves of the equalizing discharge type, has proved a much more difficult problem than it appears to be on casual consideration.

According to the present invention, a reservoir of oil is provided. In the first two forms described, this reservoir is in the rotary valve itself, and in the third form it is in the valve housing, the two arrangements indicating the possibility of alternative arrangements for almost any type of valve.

A metering orifice leads from the lower portion of the oil reservoir to the mating area of the valve and seat, and means are provided to assure that the oil in the reservoir is subject on its surface to main reservoir air pressure. Hence, there is available a substantial feeding pressure acting on the oil. However, this pressure cannot become effective unless the grooves which supply the oil to the mating surface can be connected at least at certain times to some space at a lower pressure.

If the feeding pressure differential were effective at all times, it would be virtually impossible to control the flow of oil so as to ensure a sufficiently slow feed rate. Consequently, the differential is allowed to become effective only at certain times selected by the positions of the valve; that is to say, the differential is allowed to become effective when the valve is in some functional position or positions in which it remains for short time intervals.

Referring to the H-6 valve, typical positions in which the valve remains for short time periods are: Release, Service and Emergency. In the embodiment shown in Figures 1 to 6, the differential is rendered effective in the positions just stated and ineffective in those functional positions in which the valve remains for long periods. Typical positions of the latter class are: Running, Holding and Lap.

In the illustrated embodiment of the invention as applied to the H-8 valve, feeding differential becomes effective only in two positions: First service and Service, these being assumed only for short intervals. This indicates that the selection of positions in which the differential becomes effective is not fixed or arbitrary but is subject to some modification.

In the embodiment showing application of the invention to the HS-4 valve, the differential becomes effective in Service position only, thus indicating further the latitude and selection which is afforded within the broad scope of the invention.

Since the pressure differential is not effective continuously, it becomes practicable to use a relatively large orifice in conjunction with a metering pin inserted through the orifice and of only slightly smaller dimension. The size of the interval is chosen with reference to the viscosity of the oil under conditions of service. Experience indicates that the difference in diameters between a round pin and a round orifice will ordinarily be between the limits of 0.0005 and 0.0020 inch. With a pin of convenient diameter, the differential which apparently gives best results is of the order of 0.001 inch.

The metering orifice delivers oil to a radial groove port, preferably formed in the rotary valve. The supply may be direct to the outer end of the radial port, or it may be indirect by way of a grooved port which encircles the seated area of the valve slightly within the outer margin thereof.

At its inner end, the radial groove port communicates with an arcuate groove port concentric with the axis of rotation of the valve and at or near the inner margin of the seated area of the valve.

Some rotary valve seats have a central exhaust port. Where this is the case, means may be provided to establish in the desired positions a connection from the second-named arcuate port to such exhaust port. In any event, the convenient practice is to connect the inner arcuate port at times to atmosphere or some space at pressure less than that of the main reservoir pressure, and at other times to disconnect it therefrom.

The selection of positions is subject to some latitude. For example, in a straight-air valve, "Release" and "Running" positions are one and the same. Consequently, this position is one in which the valve remains for long periods. It follows that the differential should be established only in Service position and in Emergency position, or in one of these positions. Service position is preferred because manipulations to Service position are reasonably frequent.

It is desirable to form the oil reservoir and the metering orifice together with the oil grooves in the rotary valve whenever practicable, for this arrangement makes it possible to convert existing brake valves to the lubricating type according to the invention by the mere substitution of a new rotary valve and the formation of the small pressure differential creating exhaust port in the valve seat.

This being the general principle of the invention, three embodiments will now be described with reference to the accompanying drawings in which:

Figure 1 is a sectional view of the rotary valve with its seat and housing. In order to illustrate as much as possible in this view, the planes of section have been distorted somewhat. Thus, the seat does not show any of the functional air ports of the valve and the small exhaust port for controlling lubrication is illustrated as if the seat section were taken on the line 1—1 of Figure 2. The rotary valve is sectioned as if the section were taken on the line A—A of Figure 3.

Figure 2 is a face view of the seat of the rotary valve of an H-6 brake valve modified according to the present invention. The conventional ports of the H-6 valve are indicated by legends. The limits of travel of the radial oil groove formed in the rotary valve are indicated by dot and dash lines.

Figure 3 is a face view of the rotary valve of an H-6 brake valve, with the improved lubricating system incorporated.

Figure 4 is a view of the seat shown in Figure 2, indicating the position of the lubricating grooves in the rotary valve as they exist in running position.

Figure 5 is a similar view illustrating "lap" position.

Figure 6 is a plan view in a slightly reduced scale of the back of the rotary valve whose face is shown in Figure 3.

Figure 7 is a plan view of the rotary valve of an H-8 valve equipped according to the invention, and showing removable covers for the oil reservoirs in the valve, such covers being held in place by the key which rotates the valve.

Figure 8 is a face view of the valve shown in Figure 7.

Figure 9 is a section on the line 9—9 of Figure 7.

Figures 10 and 11 are diagrams showing respectively, First service and Service positions. In these diagrams, the seat ports are shown in heavy broken lines, whereas ports and grooves in the rotary valve are shown in lighter broken lines.

Figure 12 is a section through portions of the HS-4 brake valve showing the oil reservoir with metering feed ports and a supply connection which admits main reservoir air to act on oil in the reservoir, the inverted seat for the rotary valve, and the rotary valve on such seat.

Figure 13 is a face view of the valve seat shown in Figure 12.

Figures 14, 15 and 16 are diagrams looking downward through the valve seat at the rotary valve. The seat ports are shown in heavy broken lines; the ports, cavities and grooves in the rotary valve are shown in light broken lines. The figures show, respectively, Release position, Service position and Emergency position. This valve has no Running position and Lap position is intermediate Release and Service positions, but is not illustrated as it has no functional significance as far as lubrication is concerned.

Referring to Figure 1, 11 represents the seat member of an H-6 brake valve and 12 is the bonnet or cap which is bolted thereto and sealed by a gasket as shown. 13 is the main reservoir air connection, through which main reservoir air is supplied to the space above the rotary valve 14. This valve has, on its back, two wings 15 and 16 (see Figure 6), through which the valve is rotated by a key 17 (Figure 1). The key is turned by the usual handle 18.

The H-6 brake valve has six functional positions (see Figures 4 and 5). These are known as "release," "running," "holding," "lap," "service" and "emergency" in the order stated. The functions are too well known to require description, but it will be appreciated that the valve is placed in release position only for short periods, to start the release of the brake. It is placed in service position only for short periods to reduce equalizing reservoir pressure, and will seldom remain in emergency position for long periods. On the other hand, the brake valve is customarily carried in running position and during brake applications may remain in holding or lap position for periods of substantial length.

Referring now particularly to the construction shown in Figures 1 to 6, the rotary valve 14 is drilled near its periphery to form a oil chamber 21. The end of this chamber is closed by a plug 22. A vertical drilled port 23 formed in the wing 16 is extended by a tubular inserted member 24 which makes a press fit with the drilled opening 23 and serves as an extension thereof. Another vertical tubular extension of the chamber 21 is formed by the tube 25 which is pressed into a hole drilled through the top of the valve to communicate with the oil chamber 21. In this way, two stand pipes or extensions of the chamber 21 are provided. These serve to increase the capacity of the oil reservoir.

For filling purposes a removable plug 26 is mounted in the cap 12 and in one position of the valve overlies the tube 25.

Formed in the face of the rotary valve 14 is a groove 27. This groove is close to, but definitely within the margin of the seated area of the valve. It does not completely encircle the valve but is interrupted for a short interval by a plug 28. The use of the plug is simply for convenience in manufacture. It is simpler to turn a continuous groove and then interrupt it by the plug 28 than it would be to form the groove as an interrupted groove in the first instance.

At one side of the plug 28 is the minute oil feeding port 29 which delivers oil from the reservoir 21 to the groove 27. To limit the rate of flow, reliance is not placed on the orifice 29 because it would be large enough to permit the entrance of small particles of grit which would clog the orifice. To prevent this a very slender annular orifice is availed of. This is produced by pressing into a cavity in the valve 14 at the lower margin of the chamber 21 an annular hardened bushing 31. The central opening in this annular bushing is precisely dimensioned and is nearly filled by a metering pin 32. In practice the diameter of the pin is of the order of $\frac{3}{32}$ of an inch and the diameter of the hole in the bushing is approximately 0.001 inch larger. A cross pin 33 may be mounted in the lower end of the tube 25 to prevent escape of the pin 32.

Oil entering the groove 27 through the port 29 cannot pass the plug 28, and consequently must flow in the groove 27 nearly completely around the periphery of the valve 14, where it enters a substantially radial groove 34, preferably positioned as shown with reference to the air ports of the rotary valve. This radial groove communicates with a groove 35 which is in the face of the rotary valve within the annular seated area thereof, but near the inner margin of the seated area. This groove is not a complete circle but subtends an angle of perhaps 330°, that is, from the plug 36 clockwise to the plug 37, as viewed in Figure 3.

The short interval between the plugs 36 and 37 has no functional significance and, here again, it is simply more convenient commercially to form a continuous circular groove and then stop off a portion of it by the use of the plugs 36 and 37.

Formed in the inner margin of the seat and leading to central exhaust port 20 is a small notch port 38. This is so positioned that it lies between the plugs 36 and 37 when the rotary valve is in running, holding and lap positions, and communicates with the effective portion of the groove 35 when the valve is in release, service and emergency positions.

This point is made clear by Figures 4 and 5 which show the relationship of the port 38 to the groove 35 in running and lap positions, the two limiting positions, in and between which, the pressure differential is rendered ineffective. Beyond these three positions in either direction, the connection of the port 38 with the effective portion of the groove 35 subjects the oil in the reservoir 21 to the pressure differential between main reservoir which is of the order of 110 pounds gauge and atmospheric pressure.

It follows that the radial groove 34 is kept filled with oil because at sufficiently frequent intervals an oil feeding pressure differential is temporarily developed on the oil in the reservoir 21. Under these conditions a metering pin mounted in a metering orifice will satisfactorily restrict the feed and secure very satisfactory operation.

It is not strictly necessary to feed oil to the outer groove 27 if oil be supplied to the outer end of radial groove 34. In other words, 27 can be a continuous groove not connected to groove 34 and in such case port 29 leads to the outer portion of groove 34.

Such an arrangement will be described with reference to Figures 7 to 11 and in these figures the adaptation of the invention to the H-8 brake valve will be indicated as well as ways to increase the oil reservoir capacity in a manner equally adaptable to the H-6 and H-8 brake valves.

In Figures 10 and 11 seat ports of the H-8 brake valve are indicated by legend and require no detailed description since the valve is standardized and well known.

The rotary valve 14a has wings 15a, 16a (see Figures 7 and 9) by which the valve is turned by a key (not shown) similar to key 17, Figure 1. Outside the wings on the back of the valve are chambers 24a, 25a which communicate through passage 21a (Figure 7). The tops of the chamber are closed by cap plates 23a which engage in slots 22a and are retained by the key when this enters between the wings.

Reservoir 25a geeds through port 29a to radial groove 34a under flow control by bushing 31a with metering pin 32a substantially identical with similarly numbered parts in Figure 1.

The outer end of groove 34a does not connect with the outer annular groove 27a which is continuous and located similarly to groove 27 of Figures 1 to 6. The inner end of groove 34a communicates with the inner annular port 35a which has only one interrupting plug 36a located near the junction of the two grooves as shown. Groove 35a is not within all the seat ports but encircles some, such as the warning port, the governor port, etc. (See Figures 10 and 11.)

Within groove 35a is an added port 41 which leads from the face of the rotary valve to a passage within the valve which, at least in First service and Service positions is connected to exhaust. Formed in seat 11a are two radial grooves 42 and 43, whose outer ends engage groove 35a at all times. Port 41 opens into the inner end of groove 42 in First service position (Figure 10), and into the inner end of groove 43 in Service position (Figure 11).

Thus in the arrangement of Figures 7 to 11, the feeding differential is effective only in First service position and Service position which are positions assumed for short time periods. Hence, the operation is basically similar as to oil feed to that previously described. The distribution of oil is slightly different. As the valve rotates groove 34 distributes oil. While the direction of air leakage in these rotary valves is necessarily from the periphery toward the center, the tendency of the oil, even if some air leakage occurs, is to work outward by surface tension effect as the valve turns.

Hence, oil need not be fed directly to groove 27a. Such groove could even be omitted, but its presence is desirable since it catches any outwardly moving oil, resists further outward flow and thereafter serves as a local oil reservoir.

The groove arrangement of Figures 7 to 11 is preferred. It gives satisfactory oil distribution and better resists the tendency of high pressure air to leak to the radial oil groove. A poorly fitted valve, grooved as shown in Figures 1 to 6, sometimes permits air leakage to the oil groove. The grooving of Figures 7 to 11 avoids even this occasional difficulty and gives satisfactory oil distribution.

In Figures 12 to 16, an embodiment for a convertible straight-air-automatic brake valve, such as that described in Patent No. 2,136,582, November 15, 1938, is shown. Since the oil reservoir and oil feed port are in the seat element, this looks rather different, but it really combines features of the embodiments already described and operates on the same principle.

Referring first to Figure 12, 51 represents a portion of a housing of the engineer's brake valve. 52 represents the valve seat element on the lower face of which the inverted valve seat 53 is formed. A rotary valve is shown at 54 and is provided on its lower face or back with wings 55 by which it may be rotated through a key. This key is indicated at 56.

57 represents an oil absorbing pad which surrounds a portion of the key and is used to retain oil fed to the key by the lubricating mechanism hereinafter described.

In the seat member 52 is a main reservoir air port 58. This leads through a porous filter 59 to a passage 61 formed in the member 51 and discharging into an oil reservoir 62 which is formed in the member 51 to one side of the valve stem. The oil filling port is indicated at 63 and is so located as to limit the maximum oil level to the dot and dash line indicated in Figure 12 by the legend "Oil level," it being understood that this is the maximum oil level and the oil is always subject on its upper face to main reservoir pressure.

The oil is fed from the reservoir through a metering unit comprising a plug 64 with inserted hardened metering bushing 65. Within this is loosely mounted a metering pin 66 whose dimensions follow the standards heretofore set up. Oil passing through the orifice in bushing 65 around the pin 66 is fed through a passage 67 to a small port 68 which ends on the seat of the valve (see Figure 13) in a portion of an arcuate groove 69, between two interrupting plugs 71 and 72. Thus, the shorter arc of the groove 69 between the plugs 71 and 72 is supplied with oil under main reservoir pressure. The remainder of the groove is simply a trap groove which functions approximately as does the groove 27a of Figure 8.

Near the center of the valve seat 53 is a second arcuate groove 73 which is interrupted by two plugs 74 and 75. The seat ports are identified by legends on Figure 13 and are fully explained in the prior patent, above-identified. It is deemed unnecessary to describe them in detail.

The rotary valve conforms generally to that in the prior patent, above-identified, except that it has on its face an approximately radial groove 76 which spans the interval between the grooves 69 and 73. There is also in the rotary valve a vent port 77 which leads to the space around the stem of key 56 which space is vented to atmosphere.

The operation can be traced from a comparison with Figures 14, 15 and 16, and in referring to these figures, the fact should be kept in mind that these views are drawn looking downward relatively to Figure 12. This is done because, otherwise, the sequence of valve positions would appear to be the reverse of the normal order.

In Release position (Figure 14), which is a position maintained for a long time, the outer end of the groove 76 engages the shorter arc between plugs in groove 69 and hence is fed with oil, but its inner end is on the shorter arc between plugs on the inner groove 73, whereas the port 77 opens into the longer arc and hence is isolated therefrom.

In Lap position, not illustrated, the same condition would exist.

In Service position (Figure 15) the outer end of the groove 76 engages the shorter intercepted portion of the outer groove 69 while the inner end engages the longer intercepted arc of the inner groove 73 with which the vent port 77 communicates. Hence, in Service position, the feeding pressure differential is effective. At this time, oil flows through the grooves and some of it flows through the port 77 to the key 56, thus lubricating the key. The amount so fed is quite minute.

In Emergency position (Figure 16) the outer end of the groove 76 engages the longer intercepted arc of the groove 69 and consequently is disconnected from supply. At the same time, its inner end engages the longer intercepted arc of the groove 73, while the port 77 engages the shorter intercepted arc. Thus, in Emergency position, flow is inhibited at both ends of groove 76.

The embodiment illustrated in Figures 12 to 16 resembles the embodiment of Figures 1 to 6 to the extent that a portion of the outer arcuate groove is under oil pressure. It resembles the embodiment of Figures 7 to 11 in that a large portion of the outer groove is simply an idle oil trapping groove.

In the embodiment of Figures 12 to 16, flow occurs only in Service position. This embodiment is interesting because the valve may function to control an automatic system or a straight-air system, and it belongs to that type of valve in which there is a single Release and Running position in which the supply to the brake pipe is controlled by a feed valve.

Referring to the valve embodiments illustrated, it will be observed that the location of the oil reservoirs in the rotary valve and in a portion of the valve housing have each been described.

In the first two embodiments, the oil reservoir is in the rotary valve and practically all the oil grooves are in the rotary valve, permitting the substitution in existing valves of the lubricating rotary valve provided that a necessary coacting port or ports (one for the first embodiment; two for the second embodiment) be formed in the valve seat. The possibility of selecting different positions for oil feed is also suggested.

In the first embodiment, the feed occurs in Release, Service and Emergency positions. In the second embodiment, it occurs only in two Service positions. In the third embodiment, it occurs in Service position only. The purpose of this is to indicate the latitude of choice which the invention permits. In the third embodiment, lubrication of the valve stem is also provided.

It will readily be appreciated, therefore, that while three embodiments, each especially adapted to a particular type of valve, have been illustrated, the invention is of general utility, is adaptable to a wide range of conditions, and may be variously embodied. Consequently, the detailed description above given is to be taken as exemplary and not limiting.

What is claimed is:

1. In an engineer's brake valve, the combination of a ported valve seat member; a ported rotary valve member seated thereon and subject to supply pressure on its back; an oil reservoir also subject to supply pressure and having an oil-metering orifice controlling discharge from said reservoir; and means for establishing and interrupting an oil-feeding pressure differential comprising grooves and a coacting port in the mating faces of said members, there being a groove leading arcuately from the metering orifice nearly around the seated area near the outer periphery thereof, a second arcuate groove leading nearly around the seated area inside the paths of the air ports in valve and seat, an approximately radial groove serving to connect said arcuate grooves, and an oil control port formed in the member other than that in which the second arcuate groove is formed, connected with a space at a pressure substantially lower than supply pressure and positioned to connect with said second arcuate groove in certain positions of the valve and not in others.

2. The combination defined in claim 1 in which the oil control port communicates with the second arcuate groove only in one or more of the functional positions of the valve, in which it is set for relatively short time periods, such positions being of the class typified by "release," "service" and "emergency" in conventional brake valves of the equalizing discharge type and by "service" in straight air valves.

3. The combination defined in claim 1 in which the oil reservoir and the metering orifice are formed in the rotary valve as are the grooves specified, and the oil control port is formed in the seat whereby existing valves can be converted according to the invention by substituting a new rotary valve and by forming the oil control port in the seat.

4. In an engineer's brake valve, the combination of a valve seat member; a rotary valve member seated thereon and subject to supply pressure on its back; an oil reservoir also subject to supply pressure and having an oil-metering orifice comprising a port and an inserted throttling pin controlling discharge from said reservoir; and means for establishing and interrupting an oil-feeding pressure differential comprising grooves and a coacting port in the mating faces of said members, there being a groove in one member leading arcuately from the metering orifice nearly around the seated area near the outer periphery thereof, thence approximately radially nearly to the center of the seated area where it connects with a second arcuate groove, and a port in the other member connected with a space at a pressure substantially lower than supply pressure and positioned to connect with said second arcuate groove in certain positions of the valve and not in others.

5. In an engineer's brake valve, the combination of a valve seat member; a shiftable valve seated thereon and subject to supply pressure on its back; an oil reservoir also subject to supply pressure and having an oil metering orifice controlling discharge from said reservoir to the seated area of the valve; and means for establishing and interrupting an oil feeding pressure differential comprising an oil distributing groove and at least one coacting port formed in the mating surfaces of said valve and seat, so arranged that in at least one position to which the valve is moved for short periods the groove is connected with said metering orifice and with a space at a pressure substantially lower than supply pressure, and in certain other positions at least one of said connections is interrupted.

6. In an engineer's brake valve, the combination of a valve seat member; a shiftable valve seated thereon and subject to supply pressure on its back; an oil reservoir also subject to supply pressure and having an oil metering orifice controlling discharge from said reservoir to the seated area of the valve; and means for establishing and interrupting an oil feeding pressure differential comprising an oil distributing groove and at least one coacting port formed in the mating surfaces of said valve and seat, so arranged that in at least one position to which the valve is moved for short periods the groove is connected with said metering orifice and with a space at a pressure substantially lower than supply pressure, and in certain other positions the second named of said connections is interrupted.

7. The combination defined in claim 6 in which the oil reservoir, metering orifice and oil distributing groove are formed in the valve, the orifice leading to the groove, and the coacting port is formed in the seat.

8. The combination defined in claim 6 in which the oil distributing groove is formed part in the valve and part in the seat, the coacting port is formed in the valve, and the metering orifice is so arranged that it communicates with the groove in at least one valve position in which the groove communicates with said coacting port.

9. The combination defined in claim 6, in which the oil distributing groove is formed part in the valve and part in the seat, the coacting port is formed in the valve, the metering orifice is so arranged that it communicates with the groove in at least one valve position in which the groove communicates with said coacting port, and the groove is disconnected from both the metering orifice and the coacting port in at least one position.

CHARLES A. CAMPBELL.